Patented Dec. 17, 1929

1,739,734

UNITED STATES PATENT OFFICE

WARREN A. RAINE AND RALPH C. POLLOCK, OF LONG BEACH, CALIFORNIA, ASSIGNORS TO UNION OIL COMPANY OF CALIFORNIA, OF LOS ANGELES, CALIFORNIA, A CORPORATION OF CALIFORNIA

TREATMENT OF DECOLORIZING CLAYS

No Drawing.   Application filed December 21, 1922.   Serial No. 608,382.

Our invention relates to the production of a decolorizing material of increased efficiency for use in the refining of petroleum distillates, waxes, fats, and other like materials.

It is an object of our invention to produce a decolorizing material from clays, which is of marked efficiency as compared with known decolorizing materials produced from similar clays.

A further object of our invention is to produce an active decolorizing silica gel, or silicic acid, combined with certain portions of the clay used.

A further object of our invention is to produce an incorporated silica gel from the mineral halloysite.

In the treatment of clays for the removal of impurities which are detrimental to their decolorizing activity, it is generally customary to treat the clays by different methods with an acid, preferably sulphuric acid, but such known methods of treatment are more or less inefficient because the decolorizing power of the treated clay is spent on a limited amount of oil.

By our process of treating clays, now to be disclosed, we find we are able to increase the decolorizing power of clays from 25 to 35% over any known acid treated clays on the market.

Preferably we employ as the base material for our process the mineral halloysite, obtained in its native state in Nevada and California.

Halloysite is characterized as massive, clay-like or earthy, and has a waxy, or dull, lustre. Its color will vary from white to grayish, greenish, yellowish, bluish or reddish. It is translucent to opaque, sometimes becoming translucent or even transparent in water. Chemically, it is an acid aluminum silicate and is one of a large class of similar minerals.

While we preferably employ halloysite as the base material for our process, at the same time our process may be practised with similar minerals and gives the result of increasing the decolorizing efficiency of whatever mineral may be used as a base and we do not desire to limit ourselves to the use of halloysite, although we preferably make use of it.

Our process of producing the decolorizing material consists of breaking the mineral, as obtained from the earth, in small lumps, after which the mineral is mixed with sufficient water to form a fairly thin paste. The amount of water used in general should be from two to four times the weight of mineral treated.

The mixture is then heated or boiled in a suitable manner for about fifteen minutes and at the same time it is agitated mechanically or in any other known way, until disintegration and imbibition are complete.

By imbibition we mean that the water, or other solvent, is taken up and firmly held by the colloid, which in the present case is the silicic acid, or inert material, or both, thus causing a swelling of the colloid:

After disintegration and imbibition are complete, acid is added. This may be any strong acid capable of removing impurities from and activating the clay as set out below, but sulphuric acid of about 66.2° Bé., or 98% concentration, is preferred as being most economical and the acid is added in the proportion of about one quarter to one half pound of acid to one pound of mineral in the dry state.

The acid is slowly added to the thin paste while the same is hot and during and after the addition of the acid, the mixture of acid and paste is agitated either mechanically or with compressed air or steam in a closed vessel.

After the acid has been added to the thin paste and agitated, the mixture of acid and thin paste is heated or boiled for about two hours, and during such heating or boiling, the amount of mixture is maintained approximately constant by such addition of water as may be necessary.

A reason for boiling the mixture of acid and thin paste for the time mentioned is that such treatment will release the absorbed impurities or poisons from the free or weakly combined silicic acid, or silica gel, content of the mineral, so that such impurities may be easily removed by subsequent washing.

A further purpose of the acid treatment and subsequent washing is to concentrate the active silicic acid, or silica gel, by dissolving and removing a portion of the inactive clay residue which is non-poisonous. It is not possible or desirable to remove all of this inactive clay residue, because, if such were done, the active silicic acid, or silica gel, would be dissolved or its acitivity destroyed by dehydration on account of the use of the prolonged treatment necessary and the strong acid used.

Another reason for not desiring to remove all the inactive clay residue is that such residue acts as a carrier material for the active silicic acid, or silica gel, which probably covers the particles of the inactive clay residue in the form of a thin film whereby a greater surface of the active decolorizing silicic acid, or silica gel, is exposed than would be possible with a similar amount of the silicic acid by itself, unless such were ground to a finer mesh than is generally practicable.

After the acid treatment is complete, the mixture of thin paste and acid is thoroughly washed with water, either by an intermittent or continuous washing, until the mixture is practically free from acid or soluble salts. The excess water is then removed from the washed material by any suitable draining or filtering apparatus, and after such excess water has been removed, the remaining material is carefully dried within a temperature range of about 180 to 250° F., but care must be taken while using these temperatures that the time should not be long enough to dehydrate and thus destroy the colloidal silicic acid, or silica gel, which constitutes the active decolorizing portion of the finished product.

In order to minimize the danger of dehydrating the silicic acid during the above described heating period, it is preferred to commence the heating, or drying, of the wet material at an initial temperature of about 250° F. finishing with a temperature of about 180° F. when the product is nearly dry, but of course the temperature will vary if a vacuum is used.

The properly dried product is then ground to a fine powder, in which condition it is used as a decolorizing material for oils, fats, etc. by mixing the finely ground product with the oils, fats, etc., at a temperature of about 150 to 300° F., depending upon the nature of the material to be decolorized. The agitation is continued for such a time as may be required to decolorize the material and then the mineral with the adsorbed coloring matter is removed from the treated oil by settling or filtering, the treated oil being then lighter in color depending upon the amount of decolorizing material used.

Such soluble salts as aluminum sulphate, etc. which are removed by the acid treatment and washing, may be recovered by concentrating the first wash water and allowing the soluble salts to crystallize out from the mother liquor from which they are then separated.

We desire to emphasize the fact that imbibition be complete before the addition of strong acid to the thin paste, because herein lies one of the essential features of our invention, whereby we obtain our final product of increased efficiency.

It is desirable to work the material preliminarily to a thin paste with water before the treatment with strong acid, because if the paste be too stiff, an undesirable oxidation of iron compounds, which may be present in the clays as impurities, takes place on subsequent treatment with strong acid which also tends to dehydrate the silicic acid, or silica gel.

While, with the mineral halloysite, we preferably use the proportion of water before mentioned in order to form a thin paste, at the same time in the application of our process to similar minerals, it is at times desirable to treat such similar minerals first with a dilute acid, or other electrolyte solution, in place of water in order to break the mineral down to a form suitable to a strong acid treatment. Such a weak acid solution, would be, for instance, a one half percent solution of sulphuric acid and such is added to the mineral in the proportion of two parts of acid solution to one part of the mineral, by weight.

We have determined that such treatment with weak acid permits a great economy in acid and plant capacity, but to obtain the maximum decolorizing power from the treated clay, the weak acid treatment is dispensed with. At times, when the matter of economy prevails, we use such weak acid treatment thereby sacrificing in decolorizing power to a limited extent, but this loss is more than compensated for commercially by the savings in operation.

But in any case, whether a weak acid solution, or water alone, is used to primarily break down the mineral to a thin paste, it is absolutely necessary, in order to produce our desired result, that imbibition be complete before such paste is subjected to strong acid treatment and the remaining steps of our process, as above set forth.

It is understood that while a temperature of about 150 to 300° F. is used to illustrate a suitable temperature at which oils may be treated with the finely ground and dried product, this temperature of course is merely illustrative and would be considerably lower for the treatment of such petroleum products as gasoline which flash easliy at the higher temperatures.

We claim:

1. The process of preparing an adsorbent material from clay which comprises reducing the clay with a solvent and heating until imbibition is complete, then heating with a strong mineral acid and finally washing and drying the active material.

2. The process of preparing an adsorbent material from clay which comprises in reducing the clay to a thin paste with water and heating until imbibition is complete then adding sulphuric acid and heating, finally washing and drying the active material.

3. The process of preparing an adsorbent material from clay which comprises reducing the clay to a thin paste with water and heating until imbibition is complete then adding sulphuric acid and heating, finally washing and drying the active material, the drying being done within a temperature range of about 180 to 250° F.

4. The process of preparing an adsorbent clay which comprises reducing the clay with water, heating to increase imbibition, adding sulphuric acid and boiling to activate the clay, washing and drying the activated clay under conditions to avoid dehydration.

5. The process of preparing an adsorbent material from clay which comprises reducing the clay to a thin paste with water, heating until imbibition is complete, then heating with a strong mineral acid to release impurities and to remove a portion of the inactive clay residue, washing and drying under conditions to avoid dehydration and corresponding to an initial temperature of about 250° F. and a final temperature of about 180° F. at atmospheric pressure.

6. The process of preparing an adsorbent material from clay which comprises reducing the clay to a thin paste with water, heating until imbibition is complete, heating with a strong mineral acid capable of activating the clay, washing and drying the activated clay under conditions to avoid dehydration.

7. A process for preparing an adsorbent clay which comprises reducing the clay with water, heating to increase imbibition, heating with a strong acid capable of activating the clay, and washing the resulting material.

8. A process of preparing adsorbent clay comprising treating the clay with water and heating to cause the colloids to swell, treating the clay with a strong acid, and washing the resulting material.

9. A process for preparing an adsorbent clay comprising treating clay with water to cause substantially complete imbibition, reacting the clay with a strong acid adapted to activate the clay, and separating the activated clay.

Signed at Wilmington, in the county of Los Angeles, and State of California, this 13th day of December, A. D. 1922.

WARREN A. RAINE.
RALPH C. POLLOCK.

CERTIFICATE OF CORRECTION.

Patent No. 1,739,734.  Granted December 17, 1929, to

WARREN A. RAINE ET AL.

It is hereby certified that error appears in the printed specification of the above numbered patent requiring correction as follows: Page 1, line 67, after the word "colloid" strike out the colon and insert a period; page 2, line 34, strike out the syllable "ac-", and line 44, for the word "temperature" read "temperatures"; page 3, line 4, claim 2, strike out the word "in"; and that the said Letters Patent should be read with these corrections therein that the same may conform to the record of the case in the Patent Office.

Signed and sealed this 11th day of March, A. D. 1930.

(Seal)

M. J. Moore,
Acting Commissioner of Patents.